No. 654,703. Patented July 31, 1900.
N. BASSETT.
MEANS FOR CONNECTING CABLES.
(Application filed Dec. 30, 1899.)
(No Model.)
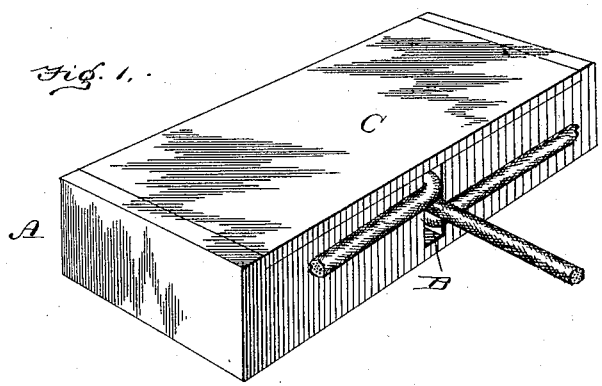
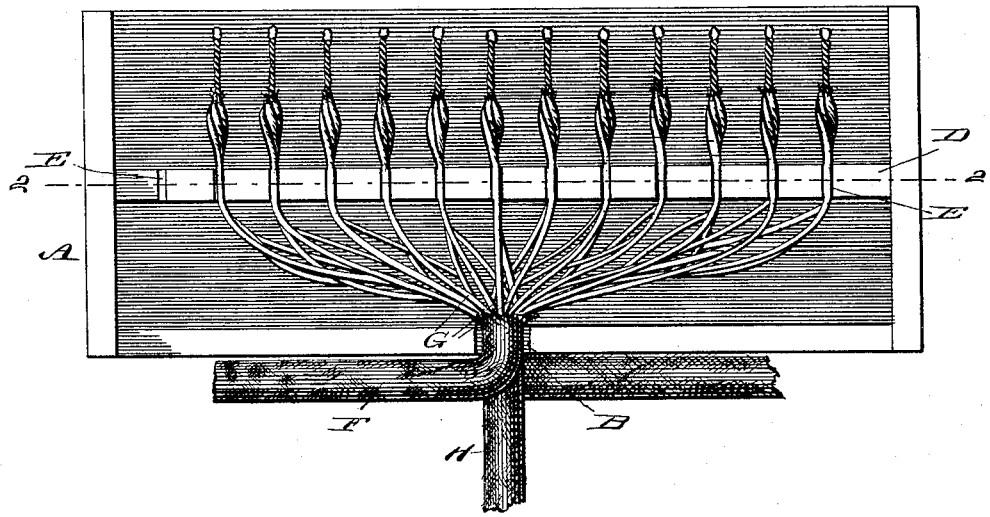
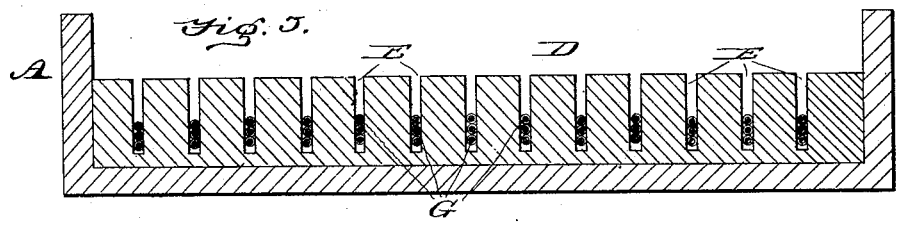
Witnesses
Edwin B. H. Tower, Jr.
Harry S. Brown
Inventor:
Nathan Bassett.
By Edwin Bro's,
Attorneys
THE NORRIS PETERS CO., PHOTO-LITHO., WASHINGTON, D. C.

UNITED STATES PATENT OFFICE.

NATHAN BASSETT, OF PHILADELPHIA, PENNSYLVANIA, ASSIGNOR TO THE GLOBE TELEPHONE MANUFACTURING COMPANY, OF SAME PLACE.

MEANS FOR CONNECTING CABLES.

SPECIFICATION forming part of Letters Patent No. 654,703, dated July 31, 1900.

Application filed December 30, 1899. Serial No. 742,098. (No model.)

*To all whom it may concern:*

Be it known that I, NATHAN BASSETT, a citizen of the United States, residing at Philadelphia, in the county of Philadelphia and State of Pennsylvania, have invented certain new and useful Improvements in Means for Connecting Cables; and I do hereby declare the following to be a full, clear, and exact description of the invention, such as will enable others skilled in the art to which it appertains to make and use the same.

This invention relates to a new and useful improvement in means for connecting telegraph, telephone, or similar cables; and its object, among other things, is to provide a device of simple construction, whereby the wires of one or more cables may be quickly, securely, and properly fastened to the corresponding wires of a single cable or of two or more cables.

The invention also dispenses with the insulating-wrapping heretofore employed and permits of a neat connection between the cables.

To these ends the invention consists in the novel construction and combination of parts hereinafter more fully described and claimed, and illustrated in the accompanying drawings, showing the preferred form of my invention, and in which—

Figure 1 is a perspective view of the connecting-box. Fig. 2 is a plan view thereof with the cover removed. Fig. 3 is a section on line 2 2, Fig. 2.

Referring to said figures by letters of reference, A is a box having a slot or passage B formed in one face thereof and provided with a cover C, removably secured thereto in any suitable manner. Within the box is a partition D, provided at suitable intervals with vertical slots E, as shown. In use the end of a cable F is inserted into the passage B and the wires G thereof placed within separate slots E of the partition D. A second cable H is placed therein in a similar manner, the wires thereof being inserted in the grooves containing the wires to which they are to be secured. The projecting ends of these wires are then twisted or otherwise secured together. It is obvious that by this construction any number of cables may be quickly and securely fastened together, and the wires of several cables may be placed in circuit with those of a single cable of similar construction.

In the foregoing description I have shown the preferred form of my invention; but I do not limit myself thereto, as I am aware that modifications may be made therein without departing from the spirit of my invention, and I therefore reserve the right to make such changes as fairly fall within the scope of my invention.

Having thus fully described my invention, what I claim, and desire to secure by Letters Patent, is—

1. A device of the character described comprising a box or closure provided with means to receive and hold the connected ends of the wires, substantially as described.

2. A device of the character described comprising a box or closure having a passage therein, and a partition provided with a series of slots for the reception of the connected ends of the wires, substantially as described.

In testimony whereof I affix my signature in presence of two witnesses.

NATHAN BASSETT.

Witnesses:
WM. K. SHRYOCK,
WM. H. SHRYOCK.